United States Patent
Iwazaki et al.

(10) Patent No.: US 7,127,339 B2
(45) Date of Patent: Oct. 24, 2006

(54) DRIVING ASSIST APPARATUS AND METHOD FOR VEHICLE

(75) Inventors: Katsuhiko Iwazaki, Shizuoka-ken (JP); Hisashi Satonaka, Susono (JP); Yuichi Kubota, Okazaki (JP); Tomohiko Endo, Toyota (JP); Akira Matsui, Toyota (JP); Hideyuki Iwakiri, Tajimi (JP); Toru Sugiyama, Toyota (JP); Seiji Kawakami, Susono (JP); Hiroaki Kataoka, Susono (JP); Yuu Tanaka, Aichi-ken (JP); Yoshifumi Iwata, Anjo (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 157 days.

(21) Appl. No.: 10/871,010

(22) Filed: Jun. 21, 2004

(65) Prior Publication Data

US 2005/0027414 A1    Feb. 3, 2005

(30) Foreign Application Priority Data

Jun. 26, 2003    (JP)    ............................. 2003-183103

(51) Int. Cl.
*G06F 7/00* (2006.01)
(52) U.S. Cl. ..................... 701/36; 701/41; 180/204
(58) Field of Classification Search .................... 701/1, 701/36, 41; 180/204, 446, 167, 199; 340/425.5
See application file for complete search history.

(56) References Cited

U.S. PATENT DOCUMENTS

| 4,931,930 A | 6/1990 | Shyu et al. |
| 6,070,684 A | 6/2000 | Shimizu et al. |
| 6,826,469 B1 | 11/2004 | Iwata et al. |
| 2001/0026317 A1 | 10/2001 | Kakinami et al. |
| 2005/0021203 A1* | 1/2005 | Iwazaki et al. ............... 701/36 |

FOREIGN PATENT DOCUMENTS

| DE | 199 40 007 A1 | 3/2001 |
| EP | 1 148 461 A2 | 10/2001 |
| JP | A 5-297935 | 11/1993 |
| JP | A 2001-001929 | 1/2001 |
| WO | WO 2004/050458 A1 | 6/2004 |

OTHER PUBLICATIONS

U.S. Appl. No. 10/871,032, filed Jun. 21, 2004, Iwazaki et al.
U.S. Appl. No. 10/871,013, filed Jun. 21, 2004, Iwazaki et al.
U.S. Appl. No. 10/870,919, filed Jun. 21, 2004, Iwazaki et al.

* cited by examiner

*Primary Examiner*—Gertrude A. Jeanglaude
(74) *Attorney, Agent, or Firm*—Oliff & Berridge, PLC

(57) ABSTRACT

A driving assist apparatus for a vehicle which calculates a path by an algorithm suitable for real-time path calculation in a vehicle-installed computing device is provided. A basic path that changes the deflection angle of the vehicle to 0 is computed from an initial vehicle position. From the basic path, a target path is computed, for example, by adding straight-line paths to the two opposite ends of the basic path. On the basis of the target path, a driving assist is performed. During the driving assist, a basic path is re-calculated. If it is determined that a similarity-enlarged path obtained through similarity enlargement of the basic path can be used to reach the target position point, a target path is re-set on the basis of the similarity-enlarged path. Then a driving assist is performed on the basis of the re-set target path.

25 Claims, 7 Drawing Sheets

DRIVING ASSIST APPARATUS AND METHOD FOR VEHICLE

INCORPORATION BY REFERENCE

The disclosure of Japanese Patent Application No. 2003-183103 filed on Jun. 26, 2003, including the specification, drawings and abstract is incorporated herein by reference in its entirety.

BACKGROUND OF THE INVENTION

1. Field of the Invention

The invention relates to vehicular driving assist apparatus and method for determining a locus of run to a target position and assisting the driving of a vehicle so that the vehicle follows the locus of run.

2. Description of the Related Art

A related-art technology for guiding a vehicle to a target position through the use of the automatic steering, the steering command, etc., is disclosed in, for example, Japanese Patent Application Laid-Open Publication No. 5-297935. In this related technology, in order to precisely guide a vehicle to a target position and cause the azimuth angle of the vehicle at the target position to coincide with a target azimuth angle, three basic track patterns are prepared. Then, in order to compensate for errors in position, azimuth angle and curvature, a cubic equation is solved. Using the thus-provided solution, the track patterns are similarity-transformed so as to set a target track.

However, in this related technology, since it is necessary to solve a cubic equation and therefore perform computation of complex numbers, the load of computation becomes great. Therefore, the real-time execution of this calculation is difficult for the existing computing units installed in vehicles. Furthermore, the use of a high-performance computing unit leads to a cost increase, and is therefore unfavorable.

SUMMARY OF THE INVENTION

As forms of the invention, driving assist apparatus and method for a vehicle described below are provided. The driving assist apparatus for a vehicle includes: a detecting portion that detects a deflection angle that is an angle formed between a direction of the vehicle at a present position and a direction of the vehicle at a target position; a setting portion that sets a basic path that extends until the deflection angle is changed to a state of 0 by steering the vehicle at a predetermined steering rate; a computing portion that computes a target path that extends from the present position to the target position based on the basic path; a driving assist portion that performs a driving assist by using the target path; and a transforming portion that re-calculates a basic path during the driving assist, and that determines whether it is possible to set a path that reaches the target position through similarity transformation of the basic path based on a relationship between the present position of the vehicle and the target position of the vehicle, and that, if it is possible to set a path, re-sets a path that reaches the target position through similarity transformation.

The driving assist method for a vehicle includes the steps of: detecting a deflection angle that is an angle formed between a direction of the vehicle at a present position and a direction of the vehicle at a target position; setting a basic path that extends until the deflection angle is changed to a state of 0 by steering the vehicle at a predetermined steering rate; computing a target path that extends from the present position to the target position based on the basic path; performing a driving assist by using the target path; and re-calculating a basic path during the driving assist, and checking whether it is possible to set a path that reaches the target position through similarity transformation of the basic path based on a relationship between the present position of the vehicle and the target position of the vehicle, and re-setting a path that reaches the target position through similarity transformation if it is possible to set a path.

According to the above-described driving assist apparatus and method, the basic path that changes the vehicle direction from the present direction of the vehicle to the direction of the vehicle at the target position by performing the steering under a predetermined condition is substantially based only on the azimuth angle, so that a path can be determined by relatively simple computation. Furthermore, since during the running along a target path, it is checked whether a similarity enlargement process is possible, the present path can easily be changed to a path obtained through similarity enlargement if such a similarity-enlarged path is computed. Therefore, computation of a path is easy, and a path can be accurately computed. As a result, guiding accuracy also improves. Furthermore, on a path obtained by using the similarity-enlarged path, the deflection angle to be changed along the entire path remains the same as that along the basic path, but the steering rate reduces. Therefore, the load on the automatic steering apparatus can be reduced. Furthermore, occurrence of the steering delay is curbed, so that the accuracy in guidance to the target position further improves.

BRIEF DESCRIPTION OF THE DRAWINGS

The above mentioned embodiment and other embodiments, objects, features, advantages, technical and industrial significance of this invention will be better understood by reading the following detailed description of the exemplary embodiments of the invention, when considered in connection with the accompanying drawings, in which.

DESCRIPTION OF THE EXEMPLARY EMBODIMENTS

In the following description, the present invention will be described in more detail in terms of exemplary embodiments.

Figure 1:
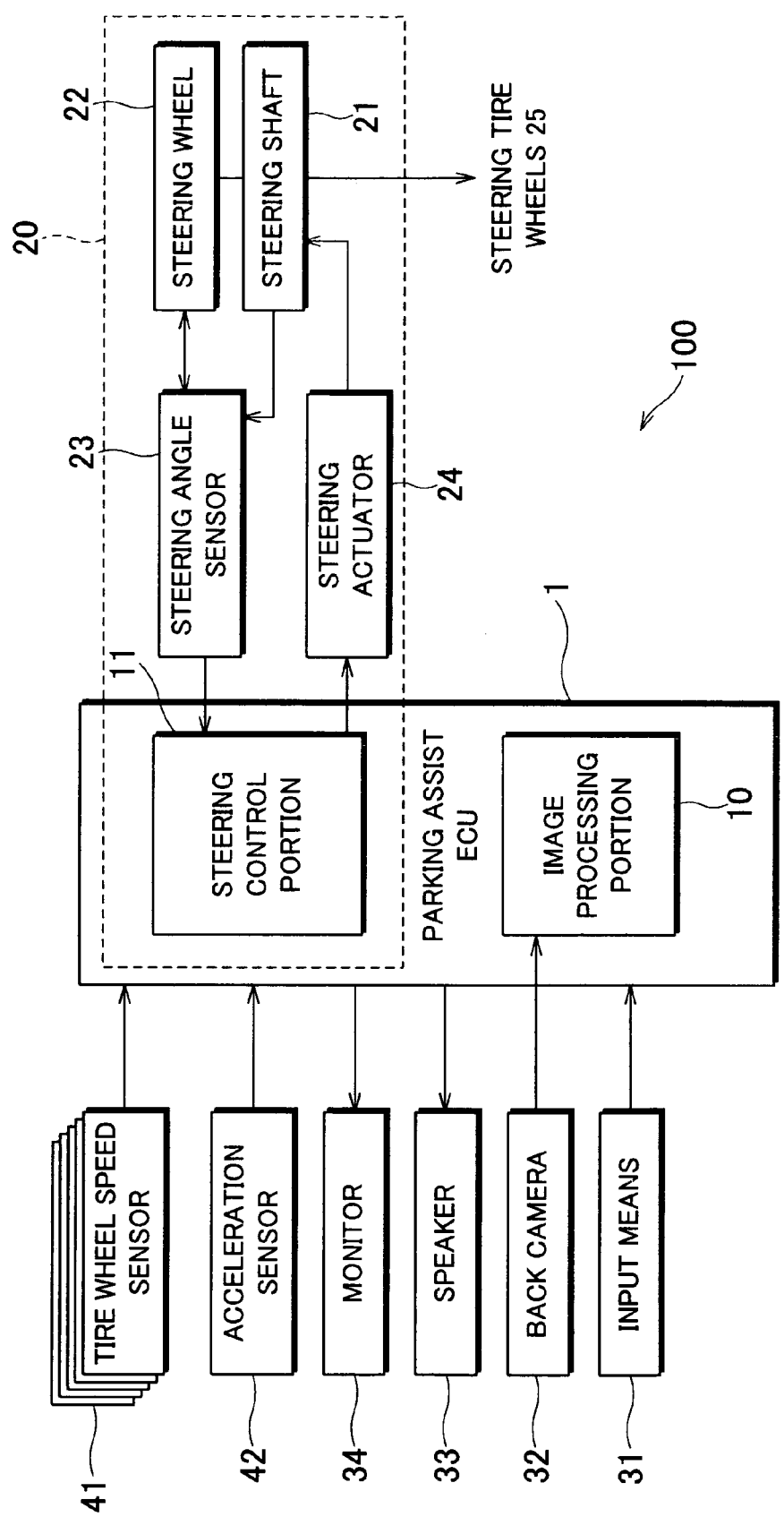
FIG. 1 is a block diagram illustrating the construction of a parking assist apparatus in accordance with an embodiment of the invention.

A driving assist apparatus in accordance with the invention will be described below with reference to a parking assist apparatus as an example. FIG. 1 is a block diagram illustrating the construction of a parking assist apparatus 100 in accordance with an embodiment of the invention. The parking assist apparatus 100 has an automatic steering device 20, and is controlled by a parking assist ECU 1 that is a control device. The parking assist ECU 1 is formed by a CPU, a ROM, a RAM, an input signal circuit, an output signal circuit, a power supply circuit, etc. Furthermore, the parking assist ECU 1 has an image processing portion 10 that processes images acquired via a back camera 32 described below, and a steering control portion 11 that controls an automatic steering device 20. The image processing portion 10 and the steering control portion 11 may be separate from each other in terms of hardware within the parking assist ECU 1, or may be separate in terms of software while sharing the CPU, the ROM, the RAM, etc. that are provided in the parking assist ECU 1.

A steering angle sensor 23 for detecting the amount of steer of a steering shaft 21 that transfers the movement of a steering wheel 22 to steering tire wheels 25, and a steering actuator 24 that provides steering force are connected to the steering shaft 21. In addition to providing a steering force during an automatic steering mode, the steering actuator 24 may serve as a power steering device that provides an assist steering force while a driver is steering. The steering control portion 11 controls the driving of the steering actuator 24.

The steering control portion 11 receives an output signal of the steering angle sensor 23, and also receives output signals of tire wheel speed sensors 41 that are provided for the individual tire wheels for detecting the rotation speeds thereof and an output signal of an acceleration sensor 42 that detects the acceleration of the vehicle.

The aforementioned image processing portion 10 receives an image signal, that is, an output signal of the back camera 32 disposed at a rear portion of the vehicle for acquiring mages in a rearward direction. The image processing portion 10 is connected to input means 31 for accepting a driver's input operation in conjunction with the parking assist, a monitor 34 for displaying information in the form of images to a driver, and a speaker 33 for presenting information in the form of sounds and voices.

Figure 2:
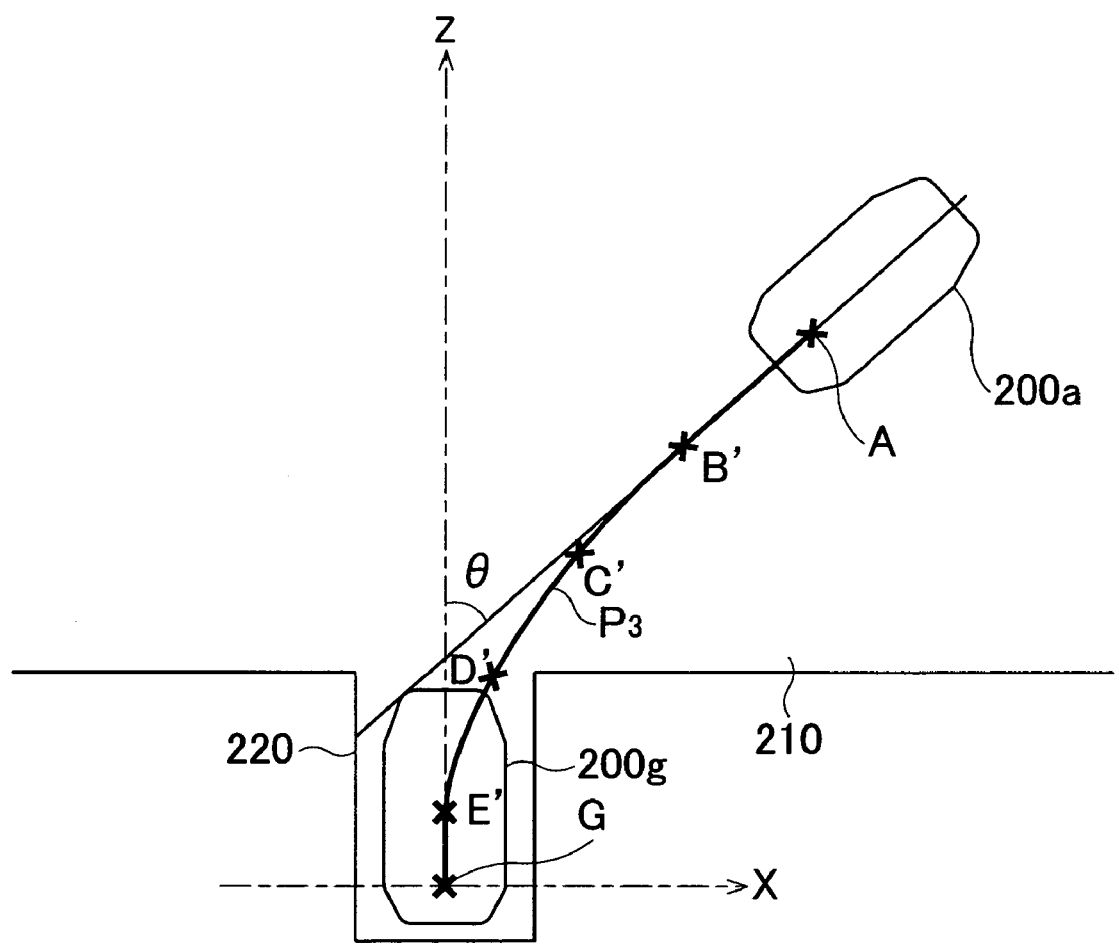
FIG. 2 is a diagram illustrating a garage parking operation, that is, a parking assist operation in a first control form of the apparatus shown in FIG. 1.
Figure 3A:
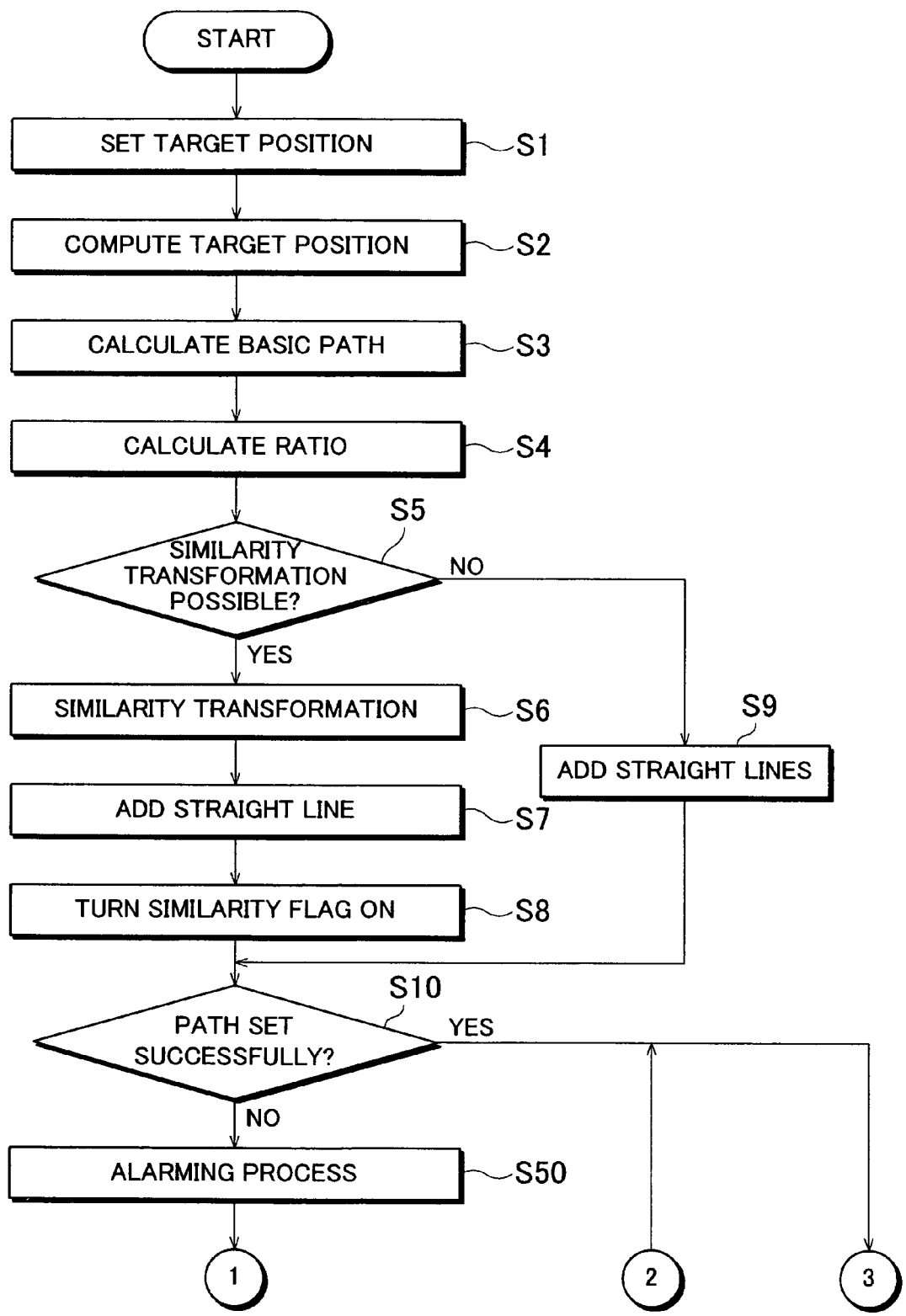
FIGS. 3A and 3B is a flowchart illustrating a control in the first control form of the apparatus shown in FIG. 1.
Figure 3B:
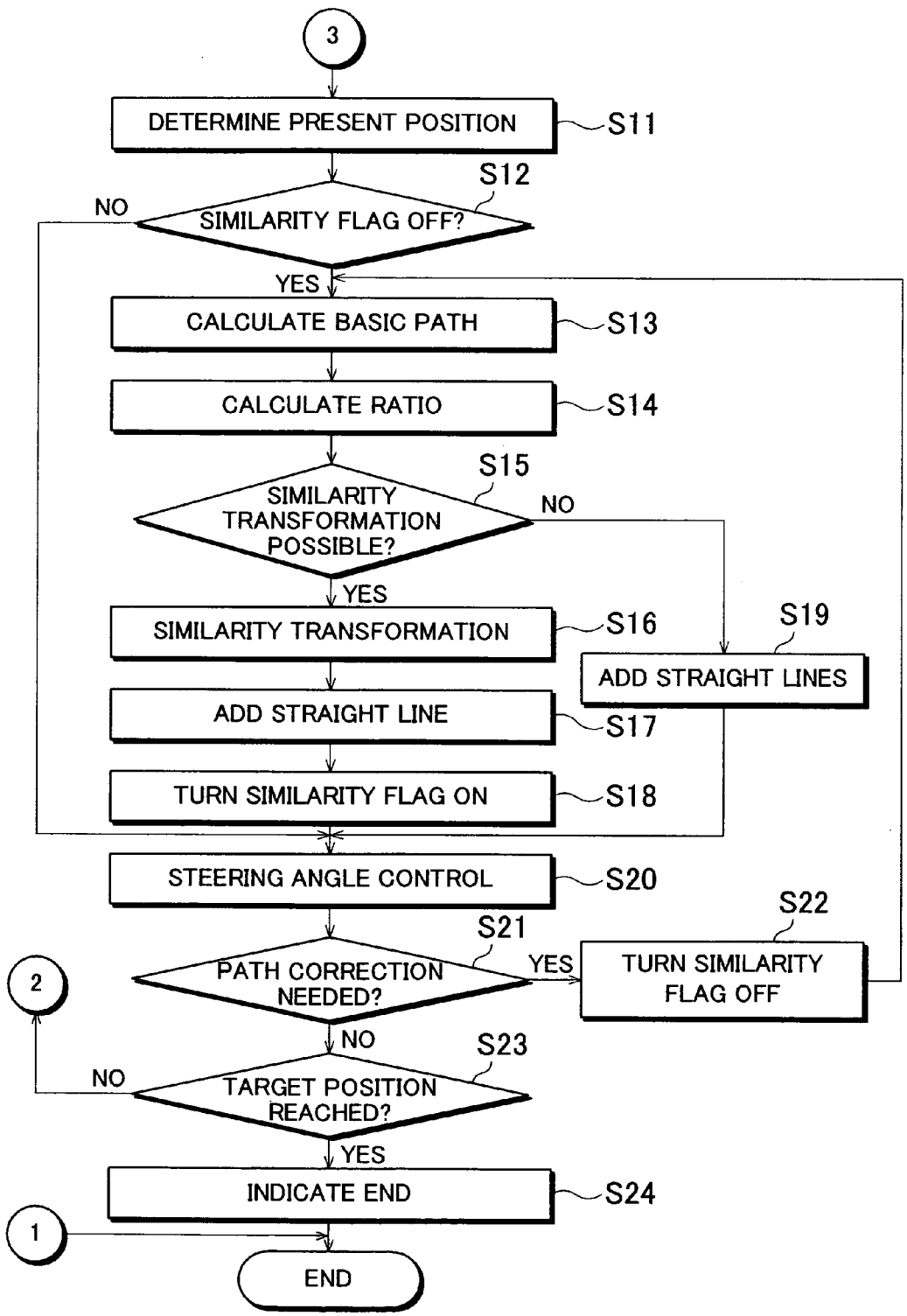
Figure 4A:
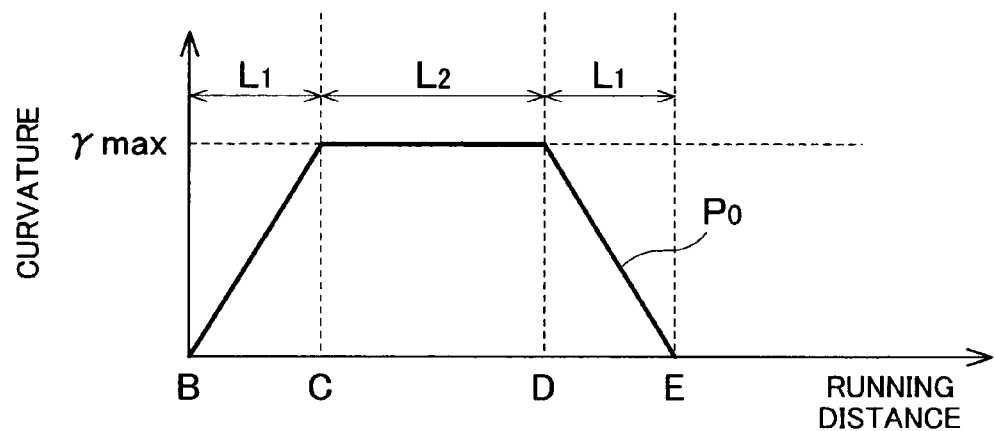
FIGS. 4A and 4B are graphs in which the curvature of turn of an assist path set by the control form of FIG. 3 is expressed with respect to the distance of run.
Figure 4B:
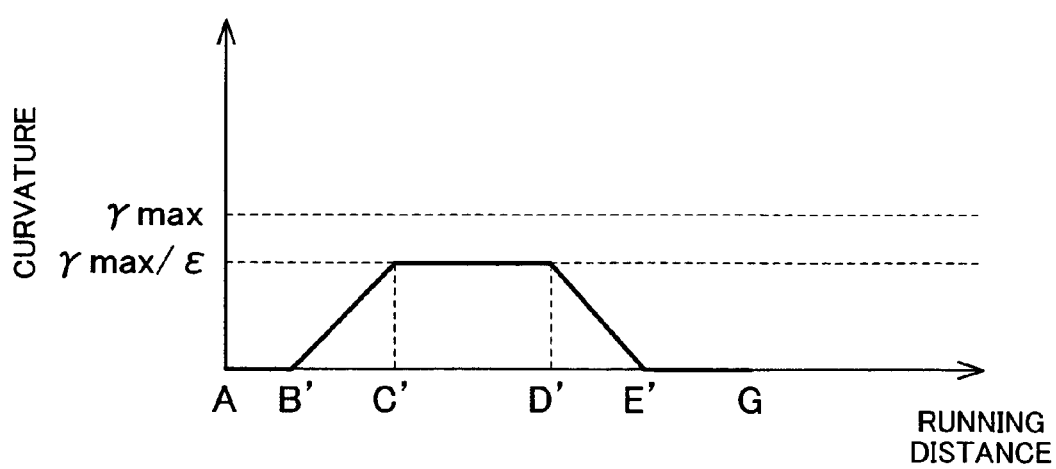
Figure 5:
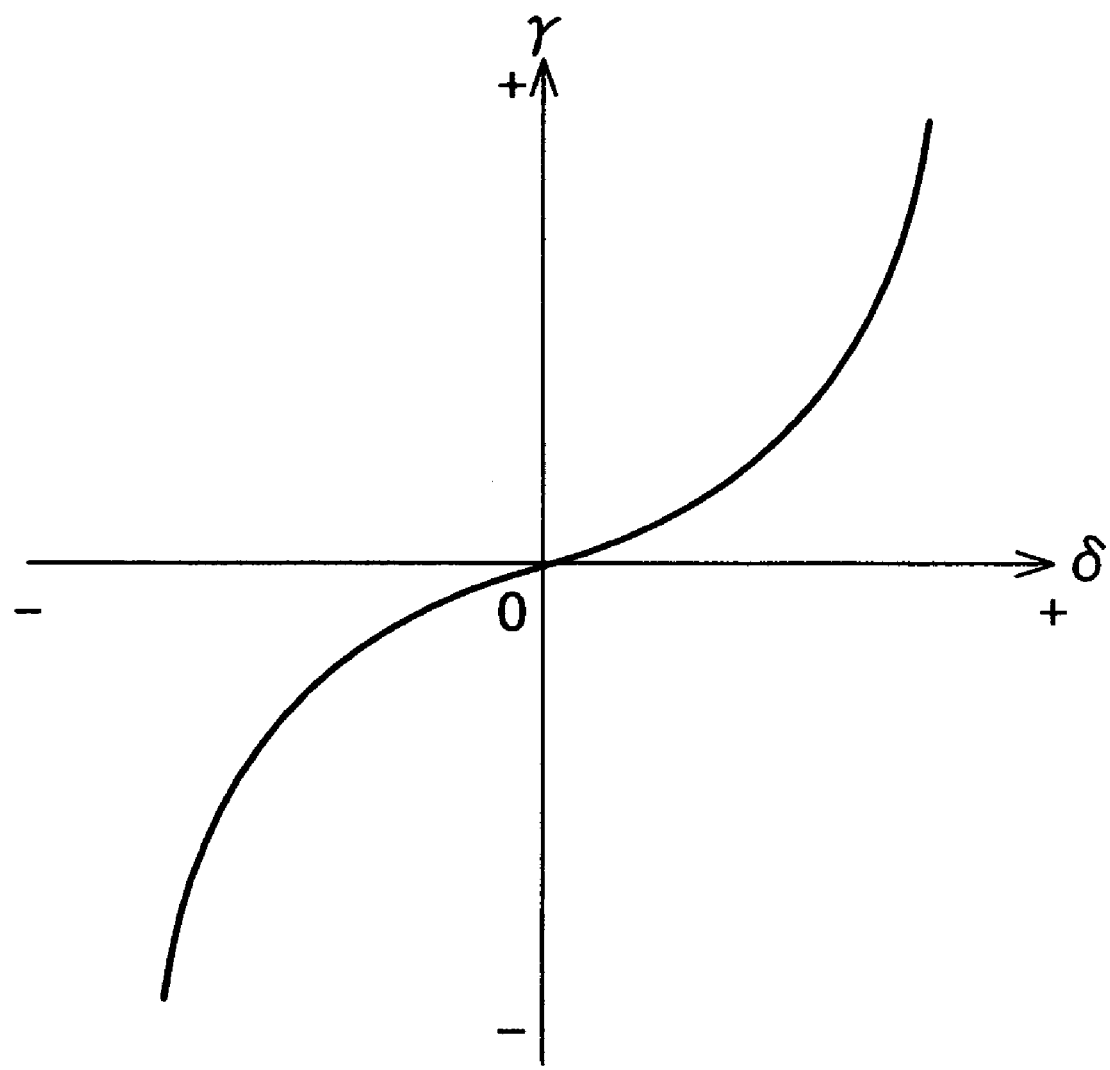
FIG. 5 is a diagram indicating a relationship between the steering angle $\delta$ and the turning curvature $\gamma$ regarding the apparatus shown in FIG. 1.
Figure 6:
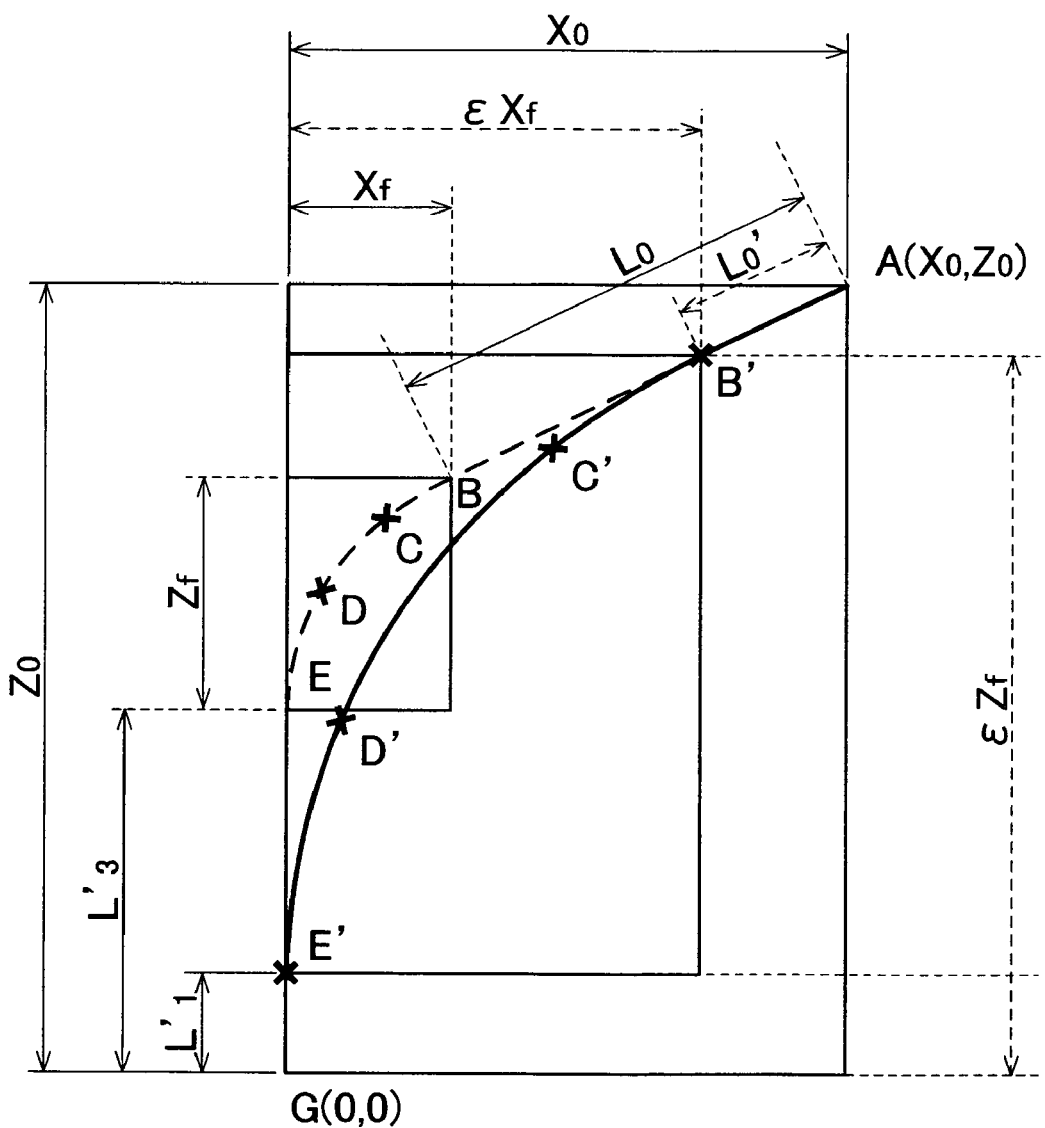
FIG. 6 is a diagram illustrating an assist path set by the control form illustrated in FIG. 3, together with a positional relationship between the vehicle and the target position.

Next, assist operations of the parking assist apparatus will be specifically described. In the description below, an assist is performed for a generally termed garage parking operation as illustrated in FIG. 2 where a vehicle 200 is backed into a garage 220 that faces a road 210. FIGS. 3A and 3B is a flowchart of a control in the first control form. FIGS. 4A and 4B are graphs each indicating the curvature of turn with respect to the distance of run in an assist path set by the control. FIG. 5 is a diagram indicating a relationship between the steering angle and the turning curvature in this apparatus. FIG. 6 is a diagram indicating a relationship of an assist path.

The control illustrated in FIG. 3 is started after the output of a command for the parking assist ECU 1 to start the parking assist following a driver's operation of the input means 31, and continues to be executed by the parking assist ECU 1 until: i) the vehicle reaches the vicinity of a specified target parking position, or ii) it is determined that the vehicle cannot reach the target parking position by a single backing run. This control continues unless the assist operation is cancelled by a driver using the input means 31.

Specifically, the driver moves the vehicle 200 to an initial position where the target parking position is displayed in an image taken by the back camera 32 and displayed in the monitor 34. After that, the driver starts a parking assist operation illustrated in FIGS. 3A and 3B. Hereinafter, the position of the vehicle 200 is expressed by using a reference point thereof (in this example, the center of the axles of the rear tire wheels of the vehicle). In the description below, it is assumed that the initial position is a point A. The vehicle being at the point A, that is, the reference point A, is indicated by 200a.

After the parking assist operation starts, the driver first operates the input means 31 while watching a back camera 32 taken image displayed in the monitor 34. At this time, the driver moves a parking frame displayed in the screen to a target parking position, thereby setting a target parking position (step S1). Hereinafter, the vehicle being at the target parking position is indicated by 200g, and it is assumed that the reference point of the vehicle 200g is a point G.

The parking assist ECU 1 determines the position of the reference point G and the direction of the vehicle 200g (vehicle direction) at the position of the reference point G through an image recognition process (step S2).

The position of the point G may be determined, for example, as a relative coordinate with respect to the reference point A of the vehicle at the present vehicle position. The below description will be made with reference to a coordinate system as shown in FIG. 2 where the target position G is defined at the origin, and the direction of the vehicle at the target position is defined as the direction of the Z axis, and the direction perpendicular thereto is defined as the direction of the X axis. Hereinafter, the angle of the present direction of the vehicle with respect to the Z axis will be termed deflection angle θ. Furthermore, the position of the point A is expressed by coordinates (x, z).

Next, a shortest path (hereinafter, referred to as "basic path") $P_0$ that is needed to reduce the deflection angle θ to zero is computed from the present deflection angle $θ_0$ (step S3). This running locus $P_0$ is set as changes in the curvature of turn (=the reciprocal of the radius of turn) with respect to the distance of run. FIG. 4A shows a running distance-turning curvature graph of the basic path $P_0$.

The shortest path $P_0$ includes a path where the steering angle is increased (First path), a path where the increased steering angle is maintained (Second path), and a path where the steering angle is returned to neutral (Third path). In each one of the first path and the third path, the amount of change in the turning curvature with respect to the running distance (the rate of change in the turning curvature) is set at a constant value. The rate of change in the turning curvature is set so that even when the vehicle speed is equal to an upper limit value for the driving assist, the amount of change in the turning curvature is less than the amount of change in the curvature achieved by the maximum steering rate of the steering actuator 24. Therefore, a path that allows a steering operation without fail can be computed.

Representative examples of the locus set in this case are as follows. Firstly, the steering angle is increased while the rate of change in the steering angle with respect to the running distance from an initial position point B to a point C is kept at a fixed value. In this case, when the point C is reached, the steering angle and the turning curvature become equal to their respective set maximum values, and the turning radius becomes equal to a set minimum turning radius (Rmin) (curvature γmax=1/Rmin) (First path). From the point C to a point D, this steering angle (turning curvature, turning radius) is maintained (Second path). From the point D, the steering angle is reduced while the rate of change in the steering angle with respect to the running distance is kept constant. In this case, the steering angle changes to the neutral state, that is, the steering angle of 0, when a point E is reached (Third path). The running locus P forms a clothoid curve where a section BC is an arc having a radius of Rmin, and a section CD is a curve having a curvature of $\gamma_0$ at an end and a curvature of 1/Rmin at the other end, and a section DE is a curve having a curvature of 1/Rmin at an end and a curvature of 0 at the other end.

In some cases where the deflection angle θ is small, the running locus has no arc section. The amount of change Δθ in the deflection angle θ in the section BC is expressed as in equation (1).

$$\Delta\theta = \int_B^E \gamma(p)dp \quad (1)$$

In equation (1), γ(p) represents the curvature at a running distance p. That is, the amount of change Δθ in the deflection angle equals an area $S_0$ indicated in FIG. 4A. This area can be expressed by $\gamma max \times (L_1 + L_2)$ where $L_1$ is the path length of the section BC (the path length of the section DE is also $L_1$) and $L_2$ is the path length of the section CD, if the path includes an arc section. If Δθ is small, the area can be expressed by $L_1 \times \omega^2$ provided that the amount of change in curvature with respect to the running distance is constant at ω during increase, and at –ω during decrease. Therefore, a path can be determined by simple computation.

Next, a ratio $A_2$ between the length Zf of the basic path $P_0$ in the direction Z and the length Xf thereof in the direction X (Zf/Xf, hereinafter referred to as "second ratio") and a ratio regarding a movement region, that is, a ratio $A_1$ between the distance $Z_0$ from the initial position to the target position in the direction Z and the distance $X_0$ from the initial position to the target position in the direction X ($Z_0/X_0$, hereinafter referred to as "first ratio") are determined (step S4). The lengths Xf, Zf of the basic path $P_0$ in the directions X, Z can be determined as in equations (2) and (3).

$$Xf = \int_B^E \sin(\theta(p))dp \quad (2)$$

$$Zf = \int_B^E \cos(\theta(p))dp \quad (3)$$

In these equations, θ(p) is the deflection angle at a running distance p.

Next, the ratio $A_1$ and the ratio $A_2$ are compared to determine whether it is possible to set a path acquired through similarity enlargement of the basic path (step S5).

In this embodiment, it is determined that similarity enlargement is possible if $A_1 \geqq A_2$. $A_1 \geqq A_2$ represents a case where the rectangle with two diagonally opposite vertexes being at the target position and the initial position is more vertically elongated in the vertical direction (Z direction) than the rectangle with two diagonally opposite vertexes being at the point B and the point E on the basic path $P_0$. If it is determined in step S5 that similarity enlargement is possible, the process proceeds to step S6, in which similarity enlargement is executed. This similarity enlargement is an enlargement of the basic path $P_0$ by the ratio $X_0/Xf$. If this enlargement is indicated by a running distance-curvature graph, the graph is enlarged by $X_0/Xf$ in the direction of running distance and is reduced by $Xf/X_0$ in the direction of curvature.

If the starting point of the similarity-transformed path is set at the initial position point A, the end point of the similarity-transformed path does not coincide with the point G but lies in the positive direction of the Z axis from the point G provided that $A_1 \geqq A_2$. Therefore, a straight-line path extending from the end point of the similarity-transformed path to the point G is added so as to set a target path (step S7).

Then, a similarity flag is set to an on-state that indicates that the similarity enlargement has been accomplished (step S8).

Conversely, if it is determined in step S5 that similarity enlargement is impossible (if $A_1 < A_2$), the process proceeds to step S9, in which straight-line paths are added to the two opposite ends of the basic path so as to set a target path. In this case, the similarity flag remains in an off-state that is its initially set state. Herein, the path length of the straight-line path from the point A to the starting point B of the basic path $P_0$ is represented by $L_0$, and the path length of the straight-line path from the end point E of the basic path $P_0$ to the point G is represented by $L_3$. Then, the following equations (4) and (5) hold.

$$X_0 = L_0 \times \sin\theta_0 + Xf \quad (4)$$

$$Z_0 = L_0 \times \cos\theta_0 + Zf + L_3 \quad (5)$$

After a target path is set in step S8 or S9, the process proceeds to step S10, in which it is determined whether an appropriate path has been set. If it is determined that an appropriate path from the present point to the target position point G cannot be set, the process proceeds to step S50. In step S50, it is indicated to the driver via the monitor 34 or the speaker 33 that the vehicle cannot reach the target position point G from the present position. After that, the process ends. The driver can initiate the parking assist operation again after moving the vehicle 200 if necessary.

If a path is successfully set, the process proceeds to step S11, in which a guiding control is performed. At this time, it is preferable that when the shift lever is set at the reverse position, the parking assist ECU 1 instruct a drive force system (not shown) to execute an engine torque increase control. The torque increase control is a control of causing a change to a high driving force state (state of increased torque) by operating the engine at a revolution speed that is higher than a normal idling speed. This control expands the range of vehicle speed where a driver can adjust the vehicle speed by using only the brake pedal without operating the accelerator, so as to improve the operability of the vehicle. If the driver operates the brake pedal, the braking force applied to each wheel is adjusted in accordance with the degree of depression of the pedal, and therefore the vehicle speed is correspondingly adjusted.

In the control of guiding the vehicle to the target position, the present position of the vehicle is first determined (step S11).

In the present position determining process, the deflection angle $\theta$ is determined as well as the coordinates $(x, z)$ of the present position. The present position $(x, z)$ and the deflection angle $\theta$ can be determined on the basis of the movement of a characteristic point in the image taken by the back camera 32. The present position $(x, z)$ and the deflection angle $\theta$ may also be determined on the basis of a change in running distance based on the output signal of the tire wheel speed sensors 41 or the acceleration sensor 42, and a change in steering angle based on the output signal of the steering angle sensor 23.

Next, the state of the similarity flag is determined (step S12).

If the similarity flag is in the off-state, that is, if the present set path is a path formed by adding straight-line paths to a basic path, the process proceeds to step S13, in which another basic path is set on the basis of the present deflection angle $\theta$.

Subsequently, as in step S4, a ratio $A_2$ between the length Zf of the re-set basic path $P_0$ in the direction Z and the length Xf thereof in the direction X (Zf/Xf, hereinafter referred to as "second ratio") and a ratio regarding a movement region, that is, a ratio $A_1$ between the distance Z from the present position to the target position in the direction Z and the distance X from the present position to the target position in the direction X (Z/X, hereinafter referred to as "first ratio") are determined (step S14).

Next, the ratio $A_1$ and the ratio $A_2$ are compared to determine whether it is possible to set a path acquired through similarity enlargement of the basic path (step S15).

In this embodiment, it is determined that similarity enlargement is possible if $A_1 \geq A_2$. $A_1 \geq A_2$ represents a case where the rectangle with two diagonally opposite vertexes being at the target position and the initial position is equal to the rectangle with two diagonally opposite vertexes being at the point B and the point E on the basic path $P_0$. Even after it is determined in step S5 that similarity enlargement is impossible, similarity enlargement may become possible as the vehicle moves if, in a beginning portion of the target path, the amount of movement in the direction X is less than the amount of movement in the direction Z.

If it is determined in step S15 that similarity enlargement is possible, the process proceeds to step S16, in which similarity enlargement is executed. This similarity enlargement is an enlargement of the re-set basic path $P_0$ by the ratio X/Xf. If this enlargement is indicated by a running distance-curvature graph, the graph is enlarged by a ratio $\epsilon$ where $\epsilon = X/Xf$ in the direction of running distance and is reduced by a ratio $1/\epsilon$ in the direction of curvature.

If the starting point of this similarity-transformed path is set at the present position, the end point of the similarity-transformed path does not coincide with the point G but lies in the positive direction of the Z axis from the point G provided that $A_1 > A_2$. Therefore, a straight-line backing path from the end point of the similarity-transformed path to the point G is added so as to set a target path (step S17).

The length of this straight-line path $L_3'$ is $(Z - \epsilon \times Zf)$. Then, the similarity flag is set to the on-state indicating that the similarity enlargement has been accomplished (step S18). After that, the process proceeds to step S20.

Conversely, if it is determined in step S15 that similarity enlargement is impossible (if $A_1 < A_2$), the process proceeds to step S19. In step S19, straight-line paths are added to the two ends of the basic path so as to set a target path. In this case, the similarity flag remains in the off-state, that is, the initially set state. After that, the process proceeds to step S20. In another possible method, the resetting of a target path may be avoided and the existing set path may be maintained to continue the process.

If it is determined in step S12 that the similarity flag is on and therefore similarity enlargement has been accomplished, the process immediately proceeds to step S20.

In step S20, steering is performed so as to follow the target path set on the basis of the determined present position (running distance). Specifically, the steer control portion 11, while monitoring the output of the steering angle sensor 23, controls the steering actuator 24 so as to drive the steering shaft 21 and turn the steering tire wheels 25. It is difficult to directly measure the turning curvature $\gamma$. Therefore, a relationship between the steering angle $\delta$ and the turning curvature $\gamma$ of the vehicle (see FIG. 5) may be determined beforehand, and the control may be performed on the basis of the relationship so as to achieve a steering angle $\delta$ corresponding to a desired turning curvature $\gamma$.

As the vehicle is moved along a target path set as described above, the driver can concentrate on safety-checking surroundings on road and adjusting the vehicle speed. Furthermore, since each wheel receives a braking force corresponding to the amount of depression of the brake pedal accomplished by the driver, the driver can safely decelerate or stop the vehicle even if there exists an obstacle, a pedestrian, or the like on the road.

After the steering angle control, it is determined whether the present position has deviated from the target path. If there is a great deviation, it is determined that path correction is needed (step S21).

The deviation from the target path can be determined, for example, by accumulating the deviation of the present position from the target position or the deviation of the actual amount of steer from the target amount of steer with respect to the distance of run. If path correction is needed, the process proceeds to step S22, in which the similarity flag is set to the off-state. Subsequently, the process returns to step S13 in order to re-set a path.

Conversely, if there is only a small deviation from the target path, the process proceeds to step S23, in which it is determined whether the vehicle has reached the vicinity of the target parking position point G. If the target parking position has not been reached, the process returns to step S11 in order to continue the assist control. If it is determined that the target parking position has been reached, the process proceeds to step S24. In step S24, it is indicated to the driver via the monitor 34 or speaker 33 that the target parking position has been reached. After that, the driving assist control ends.

FIG. 6 is a diagram illustrating a relationship between an initially set target path (indicated by a broken line) and a re-set target path (indicated by a solid line). In the description below, the scaling factor of the similarity enlargement in the re-setting is represented by $\epsilon$, and the starting point and the end point of the similarity-transformed path on the target path is represented by B' and E', respectively. Due to this similarity transformation, the maximum value of curvature reduces from $\gamma max$ of the basic path in the initially set target path to $1/\epsilon$ time $\gamma max/\epsilon$ that is, $\gamma max/\epsilon$ (the radius of curvature increases by the ratio $\epsilon$. The steering rate $\omega$ reduces by $1/\epsilon^2$. Therefore, the load on the steering actuator 24 reduces, so that the controllability of the steering control improves. Furthermore, the calculation of the ratio of similarity enlargement is simplified, and the computational algorithm is simplified, so that the use of computer resource is curbed. Furthermore, there is no deterioration in computation accuracy caused by complicated calculations. Therefore, good computation accuracy is maintained, and the accuracy in guidance to the target position improves. Furthermore, even after it is determined at the time of initial setting of a path that similarity enlargement is impossible, a similarity enlargement may be used for guidance if the similarity enlargement is determined to be possible during guidance. Therefore, the possibility of using similarity enlargement increases, which contributes to reduction of the load on the steering actuator 24.

In the foregoing embodiment, the determination as to whether similarity enlargement is possible is carried out by comparing the ratio $A_2$ (Zf/Xf) between the length Zf of the basic path in the direction Z and the length Xf thereof in the direction X and the ratio regarding a movement region, that is, the ratio $A_1$ (Z/X) between the distance Z from the present position to the target position in the direction Z and the distance X from the present position to the target position in the direction X. If $A_1 \geq A_2$, it is determined that similarity enlargement is possible. However, it is also possible to compare the ratio $A_3$ (Z/Zf) between the distance Z from the present position to the target position in the direction Z and the length Zf of the basic path in the direction Z and the ratio $A_4$ (X/Xf) between the distance X from the present position to the target position in the direction X and the length Xf of the basic path in the direction X, and determine that similarity enlargement is possible if $A_3 \geq A_4$. It is also possible to compare the reciprocals of $A_1$ and $A_2$ or compare the reciprocals of $A_3$ and $A_4$. In still another possible method, a path may be initially set by adding straight-line paths to a basic path without executing similarity enlargement, and the setting of a path using a similarity-transformed path may be performed during guidance along the initially set path.

The foregoing description has been made with reference to the case of garage parking. However, the invention is not limited to garage parking. The above-described techniques, if appropriately combined, are basically applicable to the assist in parallel parking and other driving assists. Although the basic path may be determined by computation, it is also appropriate to store quantities of state with respect to the deflection angle $\theta$ in the form of maps within the steer control portion 11. This arrangement eliminates the need to increase the computing power of the parking assist ECU 1, and allows quick computation of a path.

The foregoing embodiment is an embodiment of the parking assist apparatus having an automatic steering function. However, the invention is applicable not only to the parking assist apparatus but also to a driving assist apparatus that induces movement in accordance with a path, a lane keep system, etc.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A driving assist apparatus for a vehicle comprising:
   a detecting portion that detects a deflection angle that is an angle formed between a direction of the vehicle at a present position and a direction of the vehicle at a target position;
   a setting portion that sets a basic path that extends until the deflection angle is changed to a state of 0 by steering the vehicle at a predetermined steering rate;
   a computing portion that computes a target path that extends from the present position to the target position based on the basic path;
   a driving assist portion that performs a driving assist by using the target path; and
   a transforming portion that re-calculates a basic path during the driving assist, and that determines whether it is possible to set a path that reaches the target position through similarity transformation of the basic path based on a relationship between the present position of the vehicle and the target position of the vehicle, and that, if it is possible to set a path, re-sets a path that reaches the target position through similarity transformation.

2. The driving assist apparatus according to claim 1, wherein the setting portion sets the basic path as a change in a turning curvature of the vehicle with respect to a running distance.

3. The driving assist apparatus according to claim 1, wherein the transforming portion compares a first ratio ($Z_0$/Zf) between a distance $Z_0$ from the present position to the target position in a first direction that is a direction of the vehicle at the target position and a length Zf of the basic path in the first direction, and a second ratio ($X_0/Xf$) between a distance $X_0$ from the present position to the target position in a second direction that is a direction orthogonal to the first direction and a length $Xf$ of the basic path in the second direction, and wherein if the first ratio is greater than the second ratio, the transforming portion determines that it is possible to set a path that reaches the target position by similarity-transforming the basic path.

4. The driving assist apparatus according to claim 3, wherein the transforming portion similarity-enlarges the basic path by the ratio ($X_0/Xf$) between the distance $X_0$ from the present position to the target position in the second direction and the length $Xf$ of the basic path in the second direction.

5. The driving assist apparatus according to claim 1, wherein the transforming portion compares a first ratio ($Z_0/X_0$) between a distance $Z_0$ from the present position to the target position in a first direction that is a direction of the vehicle at the target position and a distance $X_0$ from the present position to the target position in a second direction that is a direction orthogonal to the first direction, and a second ratio ($Zf/Xf$) between a length $Zf$ of the basic path in the first direction and a length $Xf$ of the basic path in the second direction, and wherein if the first ratio is greater than the second ratio, the transforming portion determines that it is possible to set a path that reaches the target position by similarity-transforming the basic path.

6. The driving assist apparatus according to claim 5, wherein the transforming portion similarity-enlarges the basic path by a ratio ($X_0/Xf$) between the distance $X_0$ from the present position to the target position in the second direction and the length $Xf$ of the basic path in the second direction.

7. The driving assist apparatus according to claim 1, wherein the basic path includes a first path in which the steering angle and the turning curvature become equal to their respective set maximum values, and the turning radius becomes equal to a set minimum turning radius, a second path in which, this steering angle is maintained, and third path in which the steering angle is reduced while the rate of change in the steering angle with respect to the running distance is kept constant, and the steering angle changes to the neutral state.

8. The driving assist apparatus according to claim 7, wherein the basic path includes a first path in which the vehicle is driven by increasing steering angle from an initial actual steering angle to a predetermined steering angle, a second path in which the vehicle is driven by maintaining the predetermined steering angle, and a third path in which the vehicle is driven by decreasing the steering angle to 0.

9. The driving assist apparatus according to claim 1, wherein the basic path includes a first path in which the vehicle is driven by increasing steering angle from an initial actual steering angle to a predetermined steering angle, a second path in which the vehicle is driven by maintaining the predetermined steering angle, and a third path in which the vehicle is driven by decreasing the steering angle to 0.

10. The driving assist apparatus according to claim 1, wherein the apparatus sets a target parking position as the target position to perform a parking assist.

11. The driving assist apparatus according to claim 1, further comprising:
an adding portion that adds a straight-line path to a path, wherein the adding portion adds the straight-line path to at least one of a site forward of a similarity-transformed path obtain through similarity transformation of the basic path and a site rearward of the similarity-transformed path.

12. The driving assist apparatus according to claim 1, further comprising:
an adding portion that adds a straight-line path to a path, wherein if the similarity transformation of the basic path is impossible by the transforming portion, the adding portion adds a straight-line path at least one of a site forward of the basic path and a site rearward of the basic path.

13. A driving assist method for a vehicle comprising the steps of:
detecting a deflection angle that is an angle formed between a direction of the vehicle at a present position and a direction of the vehicle at a target position;
setting a basic path that extends until the deflection angle is changed to a state of 0 by steering the vehicle at a predetermined steering rate;
computing a target path that extends from the present position to the target position based on the basic path;
performing a driving assist by using the target path; and
re-calculating a basic path during the driving assist, and checking whether it is possible to set a path that reaches the target position through similarity transformation of the basic path based on a relationship between the present position of the vehicle and the target position of the vehicle, and re-setting a path that reaches the target position through similarity transformation if it is possible to set a path.

14. The driving assist method according to claim 13, wherein the basic path is set as a change in a turning curvature of the vehicle with respect to a running distance.

15. The driving assist method according to claim 13, wherein a comparison is made between a first ratio ($Z_0/Zf$) between a distance $Z_0$ from the present position to the target position in a first direction that is a direction of the vehicle at the target position and a length $Zf$ of the basic path in the first direction and a second ratio ($X_0/Xf$) between a distance $X_0$ from the present position to the target position in a second direction that is a horizontal plane direction orthogonal to the first direction and a length $Xf$ of the basic path in the second direction, and wherein if the first ratio is greater than the second ratio, it is determined that it is possible to set a path that reaches the target position by similarity-transforming the basic path.

16. The driving assist method according to claim 15, wherein the basic path is similarity-enlarged by the ratio ($X_0/Xf$) between the distance $X_0$ from the present position to the target position in the second direction and the length $Xf$ of the basic path in the second direction.

17. The driving assist method according to claim 13, wherein a comparison is made between a first ratio ($Z_0/X_0$) between a distance $Z_0$ from the present position to the target position in a first direction that is a direction of the vehicle at the target position and a distance $X_0$ from the present position to the target position in a second direction that is a direction orthogonal to the first direction and a second ratio ($Zf/Xf$) between a length $Zf$ of the basic path in the first direction and a length $Xf$ of the basic path in the second direction, and wherein if the first ratio is greater than the second ratio, it is determined that it is possible to set a path that reaches the target position by similarity-transforming the basic path.

18. The driving assist method according to claim 17, wherein the basic path is similarity-enlarged by a ratio ($X_0/Xf$) between the distance $X_0$ from the present position to the target position in the second direction and the length Xf of the basic path in the second direction.

19. The driving assist method according to claim 13, wherein the basic path includes a first path in which the steering angle and the turning curvature become equal to their respective set maximum values, and the turning radius becomes equal to a set minimum turning radius, a second path in which, this steering angle is maintained, and third path in which the steering angle is reduced while the rate of change in the steering angle with respect to the running distance is kept constant, and the steering angle changes to the neutral state.

20. The driving assist method according to claim 19, wherein the basic path includes a first path in which the vehicle is driven by increasing steering angle from an initial actual steering angle to a predetermined steering angle, a second path in which the vehicle is driven by maintaining the predetermined steering angle, and a third path in which the vehicle is driven by decreasing the steering angle to 0.

21. The driving assist method according to claim 13, wherein the basic path includes a first path in which the vehicle is driven by increasing steering angle from an initial actual steering angle to a predetermined steering angle, a second path in which the vehicle is driven by maintaining the predetermined steering angle, and a third path in which the vehicle is driven by decreasing the steering angle to 0.

22. The driving assist method according to claim 13, wherein a target parking position is set as the target position to perform a parking assist.

23. The driving assist method according to claim 13, further comprising the step of:
adding a straight-line path to a path, wherein the straight-line path is added to at least one of a site forward of a similarity-transformed path obtain through similarity transformation of the basic path and a site rearward of the similarity-transformed path.

24. The driving assist method according to claim 13, further comprising:
adding a straight-line path to a path, wherein if the similarity transformation of the basic path is impossible, the straight-line path is added to at least one of a site forward of the basic path and a site rearward of the basic path.

25. A driving assist apparatus for a vehicle comprising:
detecting means for detecting a deflection angle that is an angle formed between a direction of the vehicle at a present position and a direction of the vehicle at a target position;
setting means for setting a basic path that extends until the deflection angle is changed to a state of 0 by steering the vehicle at a predetermined steering rate;
computing means for computing a target path that extends from the present position to the target position based on the basic path;
driving assist means for executing a driving assist by using the target path; and
transforming means for re-calculating a basic path during the driving assist, and for determining whether it is possible to set a path that reaches the target position through similarity transformation of the basic path based on a relationship between the present position of the vehicle and the target position of the vehicle, and for, if it is possible to set a path, re-setting a path that reaches the target position through similarity transformation.

* * * * *